US 6,728,704 B2

(12) United States Patent
Mao et al.

(10) Patent No.: US 6,728,704 B2
(45) Date of Patent: Apr. 27, 2004

(54) METHOD AND APPARATUS FOR MERGING RESULT LISTS FROM MULTIPLE SEARCH ENGINES

(75) Inventors: Jianchang Mao, San Jose, CA (US); Rajat Mukherjee, San Jose, CA (US); Prabhakar Raghavan, Saratoga, CA (US); Panayiotis Tsaparas, Toronto (CA)

(73) Assignee: Verity, Inc., Sunnyvale, CA (US)

( * ) Notice: Subject to any disclaimer, the term of this patent is extended or adjusted under 35 U.S.C. 154(b) by 212 days.

(21) Appl. No.: 09/940,600

(22) Filed: Aug. 27, 2001

(65) Prior Publication Data

US 2003/0041054 A1 Feb. 27, 2003

(51) Int. Cl.$^7$ .................................................. G06F 17/30
(52) U.S. Cl. .............................................................. 707/3
(58) Field of Search ................................. 707/1, 3, 5, 7

(56) References Cited

U.S. PATENT DOCUMENTS

| | | | |
|---|---|---|---|
| 5,642,502 A | | 6/1997 | Driscoll |
| 5,737,595 A | | 4/1998 | Cohen et al. |
| 5,802,515 A | | 9/1998 | Adar et al. |
| 5,806,061 A | | 9/1998 | Chaudhuri et al. |
| 6,006,225 A | * | 12/1999 | Bowman et al. ............ 707/5 |
| 6,078,914 A | * | 6/2000 | Redfern ..................... 707/3 |
| 6,102,969 A | | 8/2000 | Christianson et al. |
| 6,327,590 B1 | * | 12/2001 | Chidlovskii et al. .......... 707/5 |
| 6,370,527 B1 | * | 4/2002 | Singhal ..................... 707/6 |
| 6,415,281 B1 | | 7/2002 | Anderson |
| 6,546,388 B1 | * | 4/2003 | Edlund et al. ............... 707/5 |

OTHER PUBLICATIONS

Ronald Fagin, et al., "Optimal Aggregation Algorithms for Middleware," *IBM Research Report RJ 10205*, 2000, pp. 1–40.

Sergio A. Alvarez, et al., "Web Metasearch as Belief Aggregation," *AAAI–2000 Workshop on A1 for Web Search*, 2000, Copyright ©2000, American Association for Artificial Intelligence (www.aaai.org).

Clement Yu, et al., "A Methodology to Retrieve Text Documents from Multiple Databases," *Technical report 60607–7053*, U. of Illinois at Chicago, 1999, pp. 1–29.

Yoav Freund, et al., "An Efficient Boosting Algorithm for Combining Preferences," In *Machine Learning: Proceedings of the Fifteenth International Conference*, 1998, pp. 1–17.

Luis Gravano, et al., "STARTS: Stanford Proposal for Internet Meta-Searching," In *Proceedings of ACM SIGMOD*, 1997.

Luis Gravano, et al., "Merging Ranks from Heterogeneous Internet Sources," In *Proceedings of the twenty-third International Conference on Very Large Databases (VLDB)*, Athens, Greece Aug. 26–29, 1997, pp. I–ii, 196–205.

Ellen M. Voorhess, et al., "Multiple Search Engines in Database Merging," In *Proceedings of the Second ACM International Conference on Digital Libraries (DL'97)*, 1997.

(List continued on next page.)

*Primary Examiner*—Safet Metjahic
*Assistant Examiner*—Haythim J. Alaubaidi
(74) *Attorney, Agent, or Firm*—Cooley, Godward LLP

(57) ABSTRACT

This invention includes the step of transmitting a query to a set of search engines. Any result lists returned from these search engines is received, and a subset of entries in each result list is selected. Each entry in this subset is assigned a scoring value according to a scoring function, and each result list is then assigned a representative value according to the scoring values assigned to its entries. A merged list of entries is produced based upon the representative value assigned to each result list.

23 Claims, 3 Drawing Sheets

OTHER PUBLICATIONS

O. Etzioni, et al., "Efficient Information Gathering on the Internet," In *Proceedings of the 37th Annual Symposium on Foundations of Computer Science (FOCS)*, 1996.

Ronald Fagin, et al., "Combining Fuzzy Information from Multiple Systems," In *Proceedings of Principles of Database Systems (PODS)*, 1996, pp. 1–33.

Luis Gravano, et al., "Generalizing GLOSS to Vector–Space Databases and Broker Hierarchies," In *Proceedings of the twenty–first International Conference on Very Large Databases (VLDB)*, 1995, pp. 1–24.

Ellen M. Voorhess, et al., "*The Collection Fusion Problem,*" In *Proceedings of the Third Text Retrieval Conference (TREC–3)*, 1995.

James P. Callan, et al., "Searching Disributed Collections with Inference Networks," In *Proceedings of the 18th ACM International Conference on Research and Development in Information Retrieval (SIGIR '95)*, 1995, pp. 1–8.

Brian T. Bartell, et al., "Automatic Combination of Multiple Ranked Retrieval Systems," In *Proceedings of the 17th Annual International ACM SIGIR Conference on Research and Development in Information Retrieval*, 1994.

Vagelis HRISTIDIS, et al., "PREFER: A System for the Efficient Execution of Multi–parametric Ranked Queries," In *Proceedings of ACM SIGMOD*, May 21–24, 2001, pp. 259–270.

* cited by examiner

METHOD AND APPARATUS FOR MERGING RESULT LISTS FROM MULTIPLE SEARCH ENGINES

BRIEF DESCRIPTION OF THE INVENTION

This invention relates generally to search engine technology. More specifically, this invention relates to reducing the computational overhead associated with merging results from multiple search engines.

BACKGROUND OF THE INVENTION

Contemporary computers often operate in a network environment that allows them to communicate with each other. Accordingly, they can exchange data and search and retrieve the contents of another computer in the same network. As individual computers can store information, large networks of computers can act as vast storehouses of information with each computer able to access this storehouse through the network.

Searches for information in the networked computer environment may be cumbersome due to the sheer amount of information stored, or due to the complexity of finding information in large file structures. Indeed, with the advent of the World Wide Web (WWW) as well as other forms of computer networking, and the corresponding explosion in the amount of information available, it is now simply impractical for users to search for information manually. The ability of search engines to analyze enormous amounts of data and isolate useful information thus becomes of paramount importance.

The use of search engines can speed information retrieval by automating the task of collecting information over a network of computers. In essence, users direct a computer to search for information much faster than a human ever could. Search engines are computer programs designed to seek out information based on instructions from the user. Typically, the user enters a set of instructions, often called a query, which instructs the search engine to search for specific types of information. Most contemporary search engines are designed to take a query, search a group of networked computers for information that satisfies the query, and return any results to the user. Often termed a result list, the data returned to the user normally contains, at a minimum, a number of entries or results that describe the locations of relevant information. Many times, this result list also includes an excerpt of the relevant information for the user's inspection, as well as a ranking. This ranking serves as a rough indicator of how well the returned information satisfies the query, and is usually based on a numerical scoring value or metric.

Almost all search engines work in this general manner. However, their architectures vary according to the context in which they operate. Search engines are currently constructed in at least three architectures: federated, peer-to-peer, and meta-search engines. Each is used to conduct different types of searches.

Federated search engines are used in the client-server environment. A client or server may initiate a search for data located in various networked servers. Federated search engines are most commonly used in the WWW context, but need not be limited in this manner. Typical federated engines search the WWW by utilizing programs called bots or spiders to examine the content of information available on other computers and build an index consisting of the words or other data stored in these computers, as well as where they are located. Once users enter a query consisting of words or data desired, the search engine searches its index for any locations that contain these words/data and returns a list of such locations. The result list returned is normally a list of each such returned location and any associated information, and may include Uniform Resource Locators (URLs) for finding WWW-based data, or other expressions of data location. The results or entries in this list are often ranked according to any of a number of criteria currently available, with the goal of presenting the most relevant results to the user first.

One flaw in this type of search engine is the potential for inaccurate information. Because the WWW is so large, indices are updated only sporadically, meaning searches may not uncover the most recent information. Other types of search engines avoid the need for spiders and indices, and thus present users with up-to-date information more often. One example is the peer-to-peer search engine, which can also be used for other networks besides the WWW. These search engines operate in the peer-to-peer environment, where computers are simply linked together with no centralized servers and no distinct clients. They typically work by distributing a search to various peer computers, each of which can in turn farm out the search to other computers in the same network. In this way, individual computers search only the current contents of a few peers and not the entire WWW or other network. This eliminates the need to build a large index, and delivers to the user a real-time snapshot of the content of the network or the WWW.

Finally, web meta-search engines can operate in either the client-server or peer-to-peer environment. These search engines typically act as aggregators that farm a WWW search out to other public web search engines, then process the results.

A common thread amongst all types of search engines, including the three listed above, is that all usually involve the merging of result lists. Federated search engines typically farm out a search to different search engines, each of which has access to certain server databases. The federated search engine must then merge the result lists returned by each search engine. Peer-to-peer search engines, as mentioned above, distribute a search to other engines in the same peer network. These engines can then distribute the search to other computers, and so on. At each stage, the results returned may need to be collected and merged before being passed back up the chain. Finally, meta-search engines must merge the result lists sent back by each public web search engine.

This merging tactic has its drawbacks. Currently, the merging of multiple result lists into a single list is usually accomplished by examining and ranking every single entry of every list. As one can imagine, this ranking process can become quite computationally intensive if the number of lists or the number of entries per list is large. Thus, for large lists or large numbers of lists, the computation time required by the merging process can nullify any advantage gained by operating multiple search engines at the same time.

In view of this shortcoming, it would be highly desirable to merge entries from multiple result lists into a single list in a manner that avoids some of the computational overhead associated with current methods. Accomplishing this goal would improve the speed and efficiency with which useful information could be brought to people, thus reducing the tedium associated with many different tasks.

SUMMARY OF THE INVENTION

This invention includes a method for merging multiple result lists from search engines.

The invention includes the step of transmitting a query to a set of search engines. Any result lists returned from these search engines is received, and a subset of entries from each result list is selected. Each entry in this subset is assigned a scoring value according to a scoring function, and each result list is then assigned a representative value according to the scoring values assigned to its entries. A merged list of entries is produced based upon the representative value assigned to each result list.

The invention further includes a computer-readable memory to instruct a computer to merge multiple result lists from search engines. Executable instructions stored in the memory include instructions for selecting a subset of entries from each result list. Each entry in the subset is assigned a scoring value according to a scoring function. Each result list is assigned a representative value based on a function of scoring values assigned to its entries. The entries are then ranked based on the representative value assigned to their result list.

This invention allows for a reduction in computational overhead when merging and re-ranking multiple result lists. Ranking of results is accomplished by evaluating a subset of entries instead of every single one, thus reducing the number of calculations required.

BRIEF DESCRIPTION OF THE DRAWINGS

For a better understanding of the nature and objects of the invention, reference should be made to the following detailed description taken in conjunction with the accompanying drawings, where.

Like reference numerals refer to corresponding parts throughout the several views of the drawings.

DETAILED DESCRIPTION OF THE INVENTION

Figure 1:
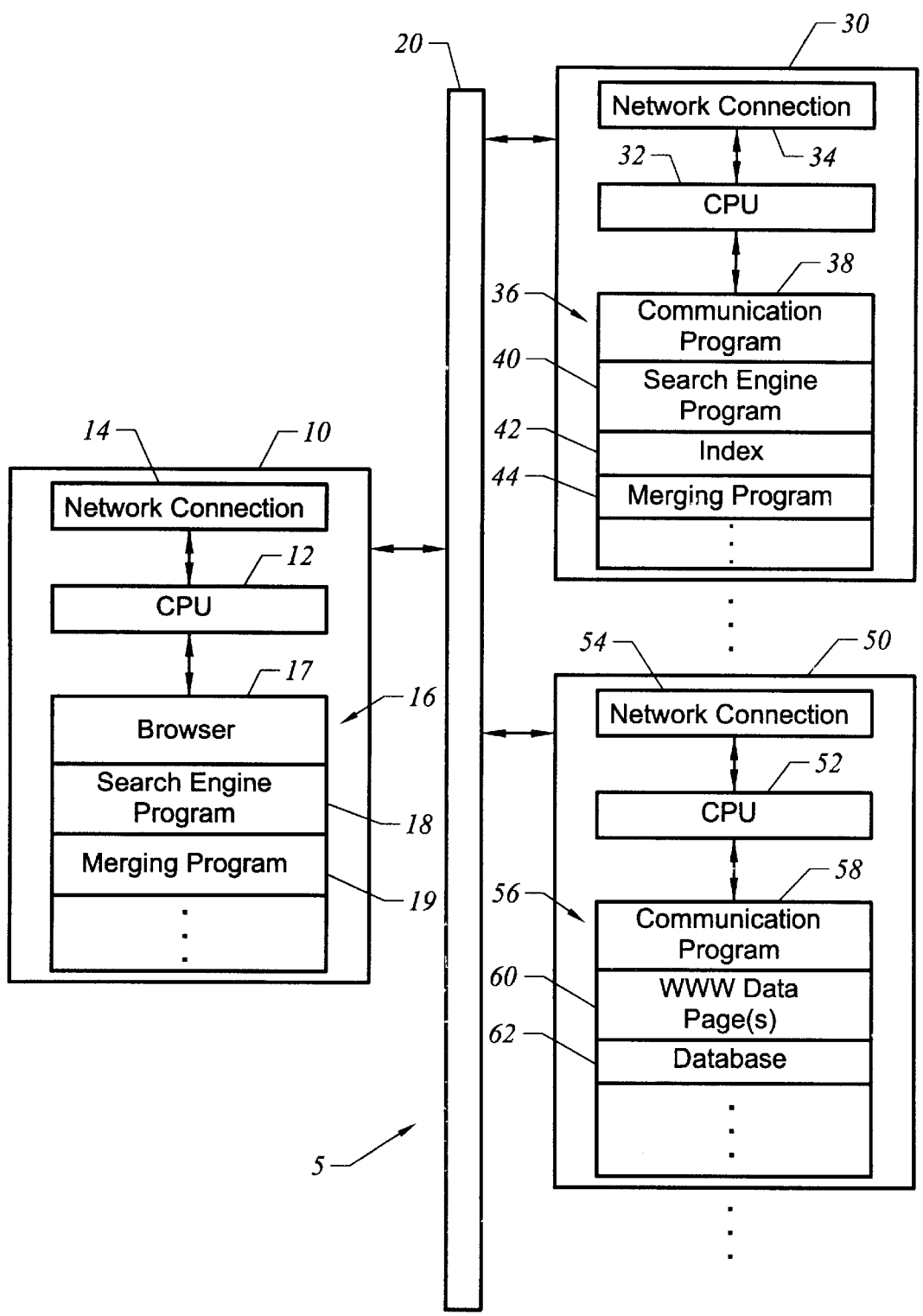
FIG. 1 illustrates a generalized computer network constructed in accordance with an embodiment of the invention.

FIG. 1 illustrates a generalized computer network 5 that may be operated in accordance with an embodiment of the present invention. This computer network 5 may operate in a client-server, peer-to-peer, or other configuration, and may also be considered a representation of the WWW. The network 5 includes at least one computer 10 connected by transmission channel 20 to a group of computers 30 and 50. Transmission channel 20 may be any wire or wireless transmission channel.

Computer 10 is a standard computer controlled by a Central Processing Unit (CPU) 12 and connected to the rest of the computers in network 5 by network connection 14. Computer 10 also includes a memory 16 that can be any form of computer-readable memory. Memory 16 contains a browser program 17 that allows users to browse the WWW. The memory 16 may also contain a search engine program 18 and an associated merging program 19 for merging different result lists, however in a client-server configuration the search engine is often resident on a different computer. The search and merging operations may be performed on any computer within the network 5.

Computer 30 may be a server computer or simply another peer of computer 10. It is also a standard computer controlled by CPU 32 and connected to the network by network connection 34. It includes a computer-readable memory 36 that contains a communication program 38 to allow the exchange of data across network 5. It also includes search engine program 40 that can be accessed by users or other computers 10. In a client-server configuration engine 40 requires an index 42 to store keywords or other data. Merging program 44 is set up to merge different result lists. Typical networks may contain a number of computers like computer 30.

Computer 50 may be a server computer or a peer of computer 10 or computer 30. It is also a standard computer controlled by CPU 52 and connected to network 5 by network connection 54. Computer-readable memory 56 contains a communication program 58 that allows the exchange of electronic information. It also contains one or more WWW data pages 60 which can be browsed by those with access to network 5. Computer 50 may also contain other forms of data stored in database 62. Typical networks may contain a number of computers like computer 50.

The present invention operates within a network of computers such as those shown in FIG. 1. More specifically, the present invention operates by engaging multiple search engines to process a query and merge the result lists for presentation to the user. In a typical client-server configuration, a user operating client computer 10 sends queries through transmission channel 20 to search engine 40, which is resident on server 30. Through the use of spiders or bots whose operations are known in the art, the search engine 40 typically will have already built up a collection of locations (which can include URLs), along with the data contained in those locations, in index 42. For example, the bots would have already searched the contents of memory 36 of computers configured like computer 30. They would have also searched the contents of WWW data pages 60 and databases 62 of computers configured like computer 50. The content from these computers would be stored in index 42. Search engine 40 then cross-checks the words or other data contained in the query against the data contained in index 42 for matches. Locations in index 42 containing data that matches the query are compiled into a result list. Search engine 40 typically transmits the same query to other search engines resident on computers configured like computer 30 and connected to transmission channel 20. These other search engines then perform separate searches in the same manner as above, compile their own result lists, and return these lists to the computer 30 that originated the search. The end result of the above is a set of result lists that must be merged by merging program 44 and returned to computer 10 for display to the user.

Note that searches using the client-server configuration do not require the use of search engine 18. The user can enter a query into computer 10 and transmit it through transmission channel 20 to search engine 40 of computer 20, where the search process could begin as described above, with search engine 40 searching its index 42 and transmitting the query to other servers, and so on. In this case, merging program 44 would create a single merged list for transmission back to computer 10.

The meta-search engine operates in similar fashion, with the added capability of allowing search engine 40 to farm the search out to other search engines located on other servers configured like computer 30. These search engines in turn compile result lists and return them to engine 40 for merging into a single list by merging program 44. This list is then returned to computer 10.

In a typical peer-to-peer configuration, a user operating computer 10 can often enter a query to search engine 18.

Search engine 18 then performs two different tasks: it searches other computers on the network for data satisfying the query, and distributes that query to other search engines on the network 5. Here, search engine 18 searches the contents of memory 36 of peer computer 30, as well as memory 56 of peer computer 50, for data matching the query. A result list containing the locations of relevant data is then compiled. Search engine 18 also farms the same query out to the search engine 40 of peer computer 30, which conducts a search in similar fashion, examining the contents of peer computers like computers 30 and 50 and compiling the results into a list. Note that this process could continue recursively, with search engine 40 farming out the same query to other search engines in network 20, which in turn could farm the search out to other search engines, and so on. Each search engine would search some of its peer computers, compile a result list, and pass it back up the chain. At each stage in this recursive process, search engines have to merge the result lists that have been passed back to them, with the process continuing until a single merged list is created by merging program 19 and is displayed to the user.

As can be seen above, in either the client-server or peer-to-peer configuration, as well as in the meta-search engine case, an essential step is the merging of several result lists into one list. In accordance with the present invention, one way to accomplish this merging is now described.

Figure 2:
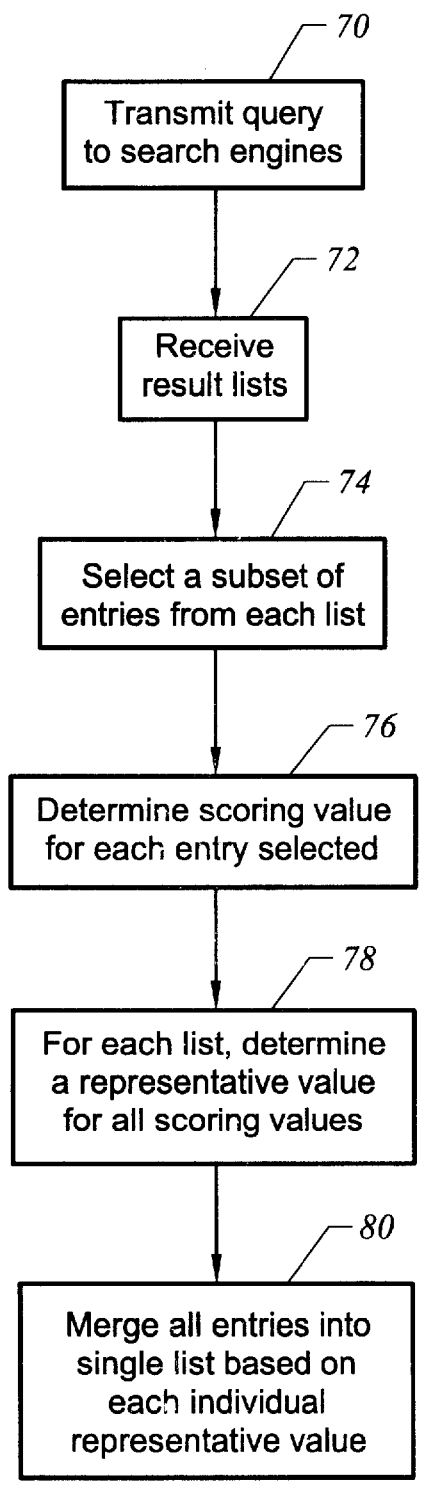
FIG. 2 illustrates processing operations in accordance with an embodiment of the invention.

FIG. 2 illustrates one embodiment of the processing operations according to the present invention. In typical operation, a query is transmitted to a first search engine, which in turn transmits the query to other search engines (block 70). Eventually, each of these other search engines returns a result list that is received by the first search engine (block 72). The first search engine then begins to merge the result lists according to the processing steps of the present invention. In essence, the result lists are merged with the goal of placing the most relevant entries first for the user's convenience. However, to reduce the associated computational overhead, lists are not merged based on an examination of every single entry. Rather, they are merged based on an examination of only a small number of entries from each list. Specifically, there is no requirement for examining the content of each result item.

A subset of entries is selected from each list (block 74). Lists are merged according to these subsets, rather than an evaluation of every single entry of every single list. The subsets may be selected according to any technique for selecting a few items out of a larger group, but three preferred embodiments are given. In the first embodiment, a number n is chosen and the top n documents are selected from each list. In the second embodiment, a number n is again chosen. The merging program 19 or 44 then selects n documents that are uniformly spaced within each result list. In the third embodiment, a number n is chosen and n documents are selected at random from each list.

The next processing step is to determine a scoring value for each entry in the various subsets selected (block 76). Scoring values are numbers that typically represent how closely the entry matches the query, where certain number ranges indicate an entry that is likely to be relevant to the user. This step is well-known in the art and includes such embodiments as setting the scoring value equal to the total number of times each word in the query appears in the entry. The present invention includes the step of determining scoring values according to any known method.

The next processing step is to determine, for each list, a representative score of all scoring values determined for its entries (block 78). The representative score may be the arithmetic average or a value proportional to the average for a set of scoring values. The present invention includes the step of determining this representative score according to any number of known techniques.

The next processing step is to merge or rank all entries from every list based on the representative score for each list (block 80). Once each result list has a representative value assigned to it, it is merged with the others accordingly. Two preferred embodiments are given for accomplishing this operation. In the first embodiment, entries are merged by selecting the list with the highest representative value (e.g., the highest average scoring value). The first entry on the list that has not already been selected is then picked. That list's representative value is then decremented by a fixed amount and the process is repeated until all entries have been picked. If any representative value drops below zero after decrementing, it is reset to its initial value. In the second embodiment, entries are merged using a probabilistic approach. Each list is assigned a probability value equal to its representative value's percentage of the total representative values for all lists. Lists are then selected according to their probability value, with lists having higher probability values being more likely to be selected. When a list is selected, the first entry on that list that has not already been selected is picked. This process is repeated, with the total representative value being revised when all entries of a list are picked.

Figure 3:
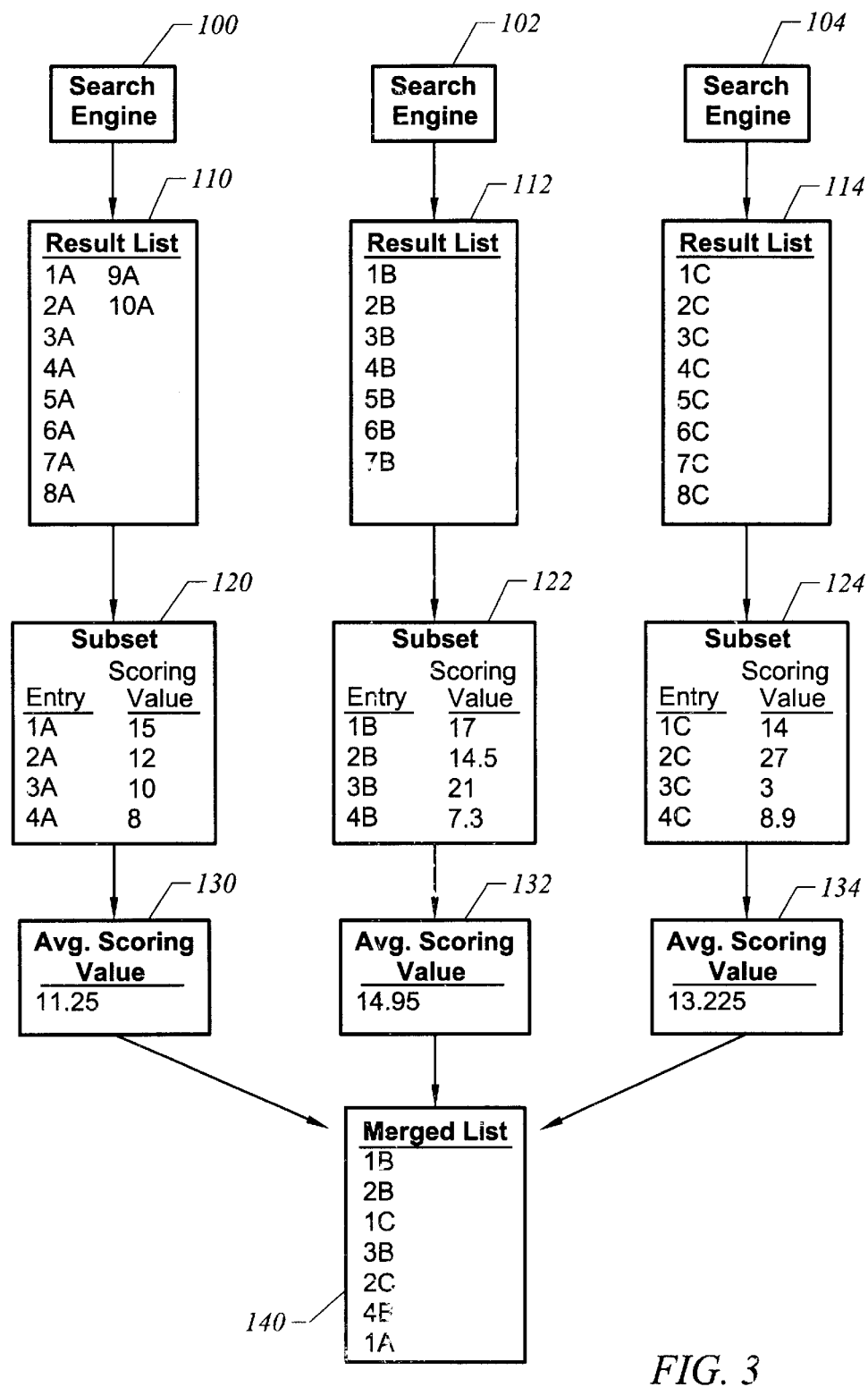
FIG. 3 illustrates an example of merging multiple result lists into a single list in accordance with an embodiment of the invention.

FIG. 3 illustrates a specific example of the processing steps of the present invention. Three search engines 100, 102, 104 process a query and return result lists 110, 112, 114 for merging. Subsets 120, 122, 124 are selected, a scoring value is assigned to each entry, and in this example average scoring values 130, 132, 134 are calculated. Based on these average scoring values, result lists 110, 112, 114 are merged into merged list 140.

The example of FIG. 3 shows the merging of three result lists, each with a specified number of entries, from three different search engines. However, the invention should not be construed as limited in this fashion; instead, it should be construed to include the merging of an arbitrary number of result lists, each including an arbitrary number of entries, from an arbitrary number of search engines.

Result lists 110, 112, 114 each contain a number of entries. As above, each entry typically includes the location and an excerpt of relevant information. Subsets 120, 122, 124 of result lists 110, 112, 114 are then selected, consisting of fewer entries than in each complete result list. The entries in subsets 120, 122, 124 are preferably but not necessarily selected according to any of the three embodiments described in connection with block 74 of FIG. 2. FIG. 3 shows subsets selected according to the first embodiment, where the first n=4 entries are chosen from each list. If the subsets were selected according to the second embodiment, where say n is chosen as n=3, then 3 evenly-spaced entries would be selected from each list. In this case, subset 120 would contain entries 1A, 6A (rounding up), and 10A. Subset 122 would contain entries 1B, 4B, and 7B. Subset 124 would contain entries 1C, 5C (again rounding up), and 8C. If the subsets were selected according to the third embodiment, with say n=5, then each subset 120, 122, 124 would include 5 entries selected at random from result lists 110, 112, 114 respectively.

Once the entries in each subset are determined, a scoring value is assigned to them. As above, this scoring value can be assigned according to any scoring function known in the art. Typically, scoring functions assign a numerical value based on the relevance of the entry to the query, with higher numerical values indicating greater relevance to the query. Typical scoring values are shown next to the entries in subsets 120, 122, 124. In this example, the scoring values are averaged to produce average scoring values 130, 132, 134. For example, the scoring values assigned to the entries in subset 120 are 15, 12, 10 and 8. The average of these four numbers is 11.25, shown in average scoring value 130.

Result lists 110, 112, 114 can now be merged into merged list 140. As above, this is accomplished using the representative value assigned to each list. In this example, the representative value assigned to each list is an average scoring value.

In this example, the list with the highest average scoring value is selected first. In FIG. 3, this is result list 112, having an average scoring value 132 of 14.95. The first unselected entry, 1B, is selected first. Average scoring value 132 is then decremented by some amount. If that amount is chosen to be 1.0, average scoring value 132 takes on a value of 14.95− 1.0=13.95. Because 13.95 is still the highest average scoring value, 2B is chosen next and average scoring value 132 is decremented by another 1.0 to take on a value of 12.95. Now, the highest average scoring value is value 134, or 13.225. Entry 1C is thus the next entry selected. Scoring value 134 is then decremented to 12.225; value 132, which is at 12.95, is now the highest value again. Entry 3B is thus chosen next, and value 132 is decremented to 11.95. This means value 134 is now the highest value. Entry 2C is then chosen, and value 134 is decremented to 11.225. This means value 132 is again the highest value, so entry 4B is selected next and value 132 is decremented to 10.95. Value 130 is now the highest value, so entry 1A is chosen and value 130 is decremented to 11.25−1.0=10.25. This process repeats until all entries from all three lists are selected.

According to another embodiment, each list 110, 112, 114 is assigned a probability value equal to its average scoring value's percentage of the total of all average scoring values. Entries are then selected from each list based on its probability value. Here, for instance, the total of all average scoring values 130, 132, 134 is 11.25+14.95+13.225= 39.425. This means result list 110 is assigned a probability value equal to (11.25/39.425)100%=28.54%. In like manner, result list 112 is assigned a probability value of (14.95/ 39.425)100%=37.92%, and result list 114 is assigned a probability value of (13.225/39.425)100%=33.54%. Result lists are then selected in pseudorandom fashion, where at each selection result list 110 has a 28.54% chance of being picked, list 112 has a 37.92% chance, and list 114 has a 33.54% chance. Once a list is selected, the first entry that has not already been selected is picked. Once every entry in a list is selected, the total of all average scoring values is recalculated without that list's average scoring value, and the process continues until every entry of every list has been selected.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of merging result lists from multiple search engines, said method comprising:
   transmitting a query to a set of search engines;
   receiving in response to said query a result list from each search engine of said set of search engines, each result list including one or more entries;
   selecting a subset of entries from each result list to form a set of selected entries;
   assigning to each selected entry of said set of selected entries a scoring value according to a scoring function;
   assigning to each subset a representative value according to the scoring values assigned to its entries; and
   producing a merged list of entries in a predetermined manner based on the representative value assigned to each result list,
   wherein the representative value varies in accordance with predetermined manner.

2. The method of claim 1 wherein said selecting includes selecting a consecutive number of entries from each result list, including the first entry from each result list.

3. The method of claim 1 wherein said selecting includes selecting a uniform number of entries that are uniformly spaced within each result list.

4. The method of claim 1 wherein said selecting includes selecting a uniform number of entries at random from each result list.

5. The method of claim 1 wherein said producing includes (A) selecting the result list having the highest average value so as to form a selected list, (B) selecting from said selected list the first entry that has not already been selected for ranking, (C) decrementing the average value of said result list by a specified number, and repeating (A), (B) and (C) in order until every entry in every result list has been selected.

6. The method of claim 1 wherein said producing includes (A) assigning to each result list a probability value based on its avenge value, (B) selecting a result list preferentially based on its probability value so as to form a selected list, (C) selecting from said selected list the first entry that has not already been selected for ranking, and repeating (A), (B) and (C) in order until every entry in every result list has been selected.

7. A computer-readable memory to instruct a computer to function in a specified manner, comprising:
   executable instructions stored in said memory, said executable instructions including:
      instructions for forming a set of selected entries by selecting a subset of entries from each result list of a set of result lists, wherein each result list in said set of result lists has been generated in response to a query processed by a search engine;
      instructions for assigning each entry of said set of selected entries a scoring value according to a scoring function;
      instructions for assigning each result list in said set of result lists a representative value based on the scoring values assigned to its entries; and
      instructions for ranking every entry based on the representative value assigned to its result list,
   wherein said instructions for ranking include instructions for (A) assigning to each result list a probability value that is based on its average value, (B) selecting a result list preferentially based on its probability value so as to form a selected list, (C) selecting from said selected list the first entry that has not already been selected for ranking, and repeating (A), (B) and (C) in order until every entry in every result list has been selected.

8. The computer-readable memory of claim 7 wherein said instructions for forming include instructions to select a consecutive number of entries from each result list, including the first entry from each result list.

9. The computer-readable memory of claim 7 wherein said instructions for forming include instructions to select a uniform number of entries that are uniformly spaced within each result list.

10. The computer-readable memory of claim 7 wherein said instructions for forming include instructions to select a uniform number of entries at random from each result list.

11. The computer-readable memory of claim 7 wherein said instructions for ranking include instructions for (A) selecting the result list having the highest average value so as to form a selected list, (B) selecting from said selected list the first entry that has not already been selected for ranking, (C) decrementing the average value of said result list by a specified number, and repeating (A), (B) and (C) in order until every entry in every result list has been selected.

12. A method of merging result lists from multiple search engines, said method comprising:

transmitting a query to a set of search engines;

receiving in response to said query a set of result lists, each result list in said set of result lists including one or more entries;

selecting a subset of entries from each result list;

determining a scoring value for each entry of said subset of entries;

characterizing said subset in accordance with a representative value; and merging entries in a predetermined manner into a single list based on said representative value, wherein said representative value varies in accordance with said predetermined manner.

13. The method of claim 12 wherein said selecting includes selecting a consecutive number of entries from each result list, including the first entry from each result list.

14. The method of claim 12 wherein said selecting includes selecting a uniform number of entries that are uniformly spaced within each result list.

15. The method of claim 12 wherein said selecting includes selecting a uniform number of entries at random from each result list.

16. The method of claim 12 wherein said merging includes (A) selecting the result list having the highest average value so as to form a selected list, (B) selecting from said selected list the first entry that has not already been selected for ranking, (C) decrementing the average value of said result list by a specified number, and repeating (A), (B) and (C) in order until every entry in every result list has been selected.

17. The method of claim 12 wherein said merging includes (A) assigning to each result list a probability value based on its average value, (B) selecting a result list preferentially based on its probability value so as to form a selected list, (C) selecting from said selected list the first entry that has not already been selected for ranking, and repeating (A), (B) and (C) in order until every entry in every result list has been selected.

18. A computer-readable memory to instruct a computer to function in a specified manner, comprising:

executable instructions stored in said memory, said executable instructions including:

instructions for transmitting a query to a set of search engines;

instructions for receiving in response to said query a set of result lists, each result list in said set of result lists including one or more entries;

instructions for selecting a subset of entries from each result list;

instructions for determining a scoring value for each entry of said subset of entries;

instructions for characterizing said subset in accordance with a representative value; and instructions for merging entries in a predetermined manner into a single list based on said representative value, wherein said representative value varies in accordance with said predetermined manner.

19. The computer-readable memory of claim 18 wherein said instructions for selecting include instructions to select a consecutive number of entries in each result list, including the first entry from each result list.

20. The computer-readable memory of claim 18 wherein said instructions for selecting include instructions to select a uniform number of entries that are uniformly spaced within each result list.

21. The computer-readable memory of claim 18 wherein said instructions for selecting include instructions to select a uniform number of entries at random from each result list.

22. The computer-readable memory of claim 18 wherein said instructions for merging include instructions for (A) selecting the result list having the highest average value so as to form a selected list, (B) selecting from said selected list the first entry that has not already been selected for ranking, (C) decrementing the average value of said result list by a specified number, and repeating (A), (B) and (C) in order until every entry in every result list has been selected.

23. The computer readable memory of claim 18 wherein said instructions for merging include instructions for (A) assigning to each result list a probability value that is based on its average value, (B) selecting a result list preferentially based on its probability value so as to form a selected list, (C) selecting from said selected list the first entry that has not already been selected for ranking, and repeating (A), (B) and (C) in order until every entry in every result list has been selected.

\* \* \* \* \*